Sept. 24, 1935.　　　D. K. HOPKINS　　　2,015,184
WELDING MACHINE
Filed Dec. 6, 1933　　　4 Sheets-Sheet 1
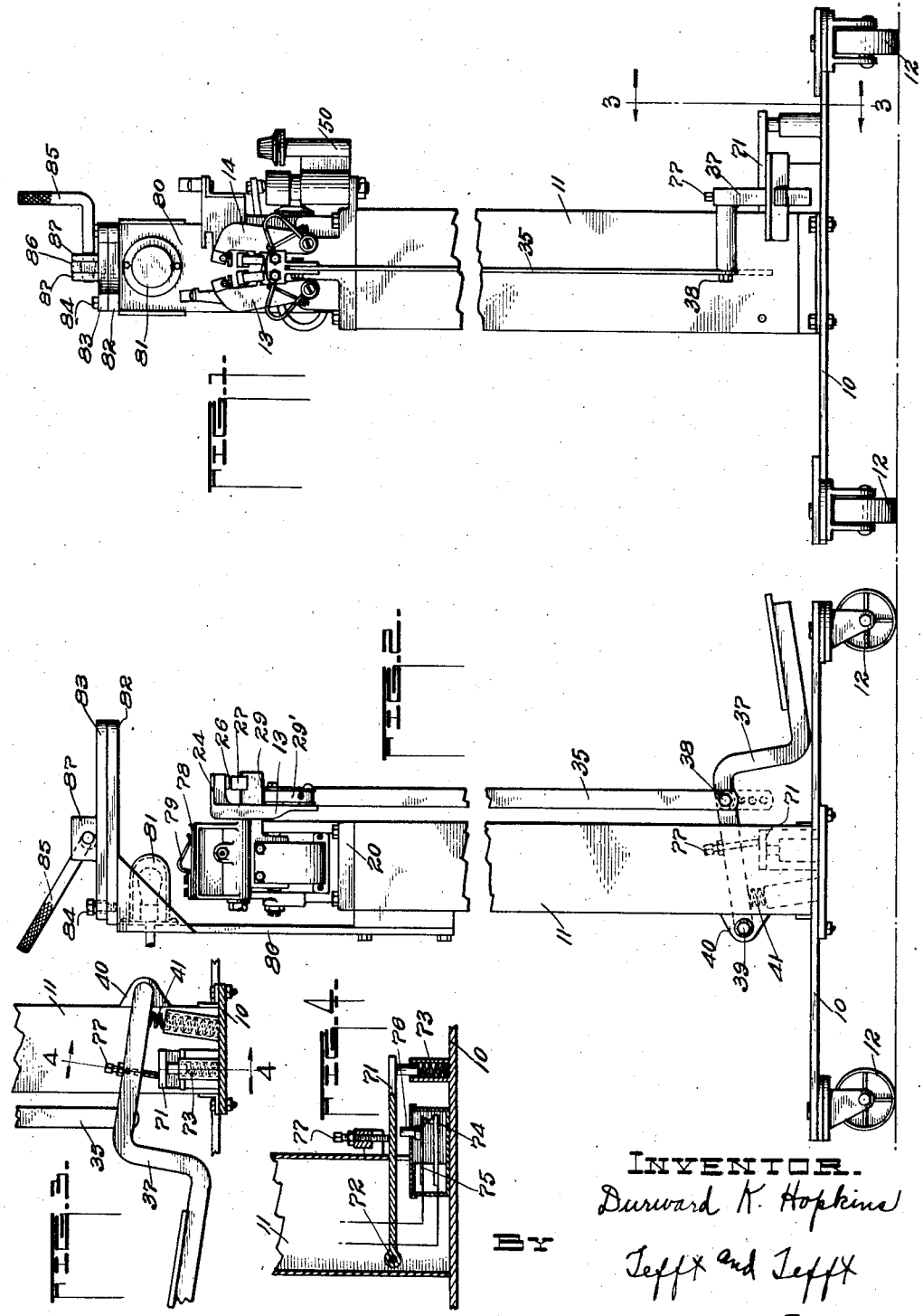

Sept. 24, 1935.　　　D. K. HOPKINS　　　2,015,184
WELDING MACHINE
Filed Dec. 6, 1933　　　4 Sheets-Sheet 2
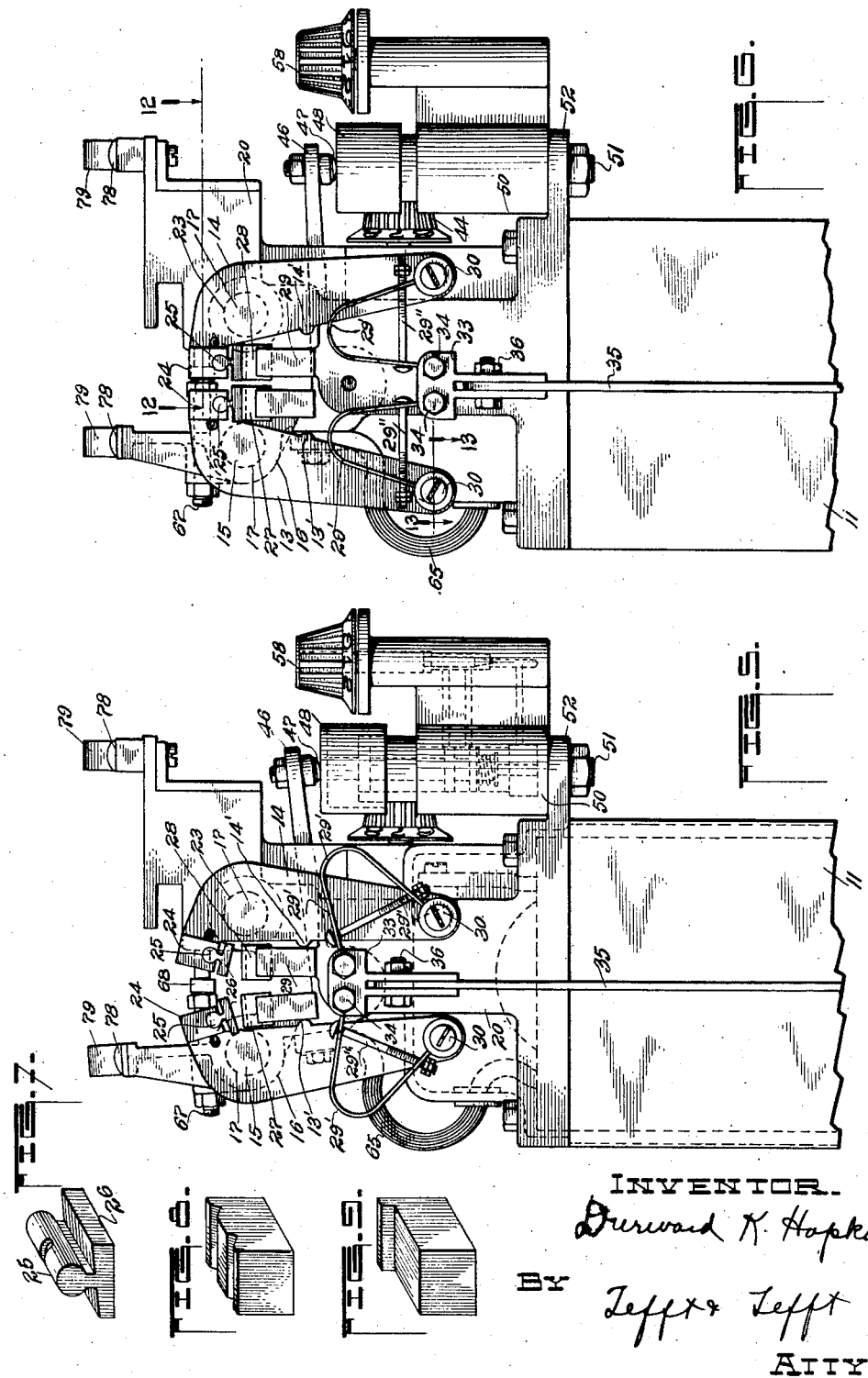
INVENTOR.
Durward K. Hopkins
BY Jefft & Jefft
ATTYS Sept. 24, 1935.   D. K. HOPKINS   2,015,184
WELDING MACHINE
Filed Dec. 6, 1933   4 Sheets-Sheet 3
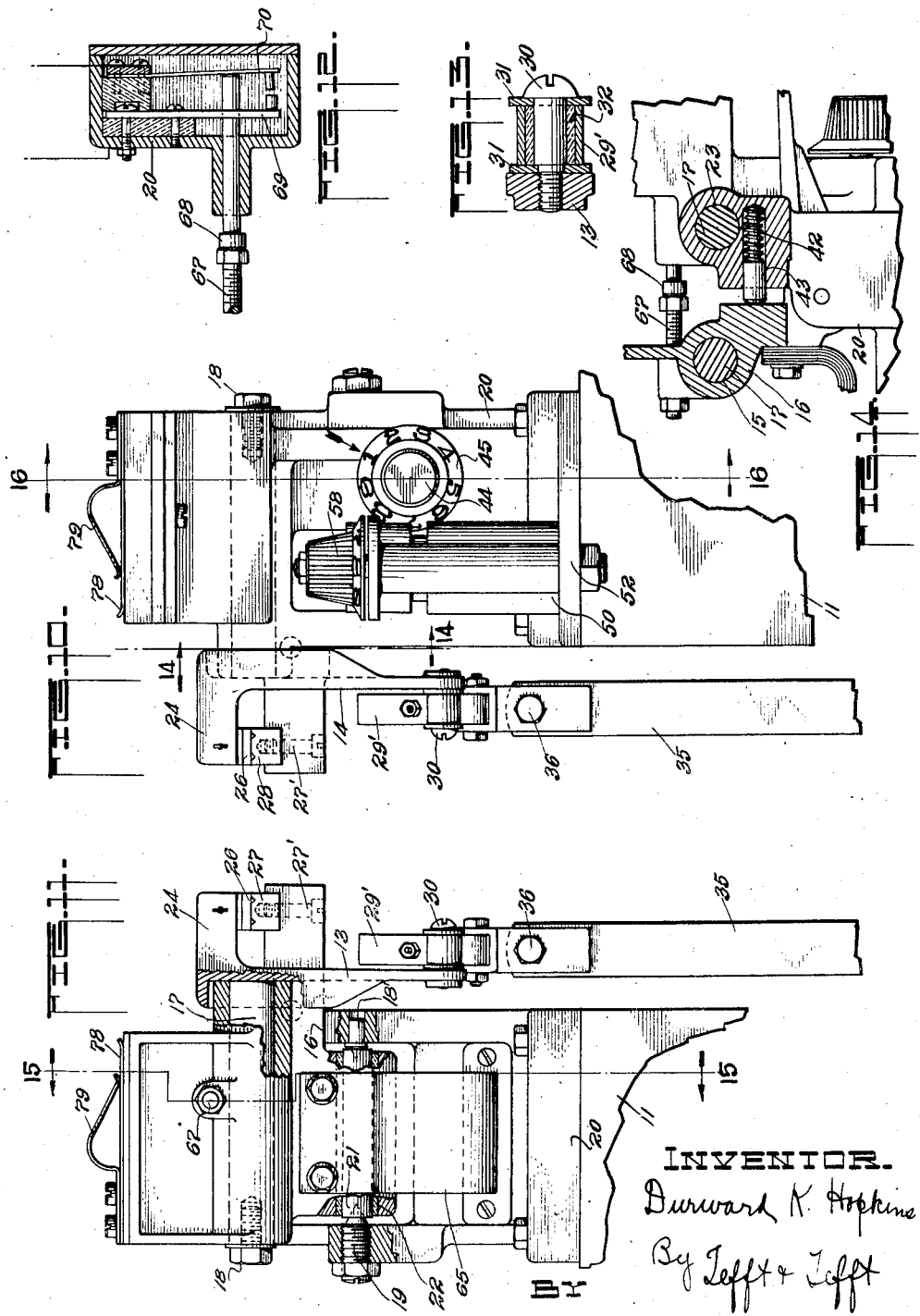

Sept. 24, 1935.   D. K. HOPKINS   2,015,184
WELDING MACHINE
Filed Dec. 6, 1933    4 Sheets-Sheet 4
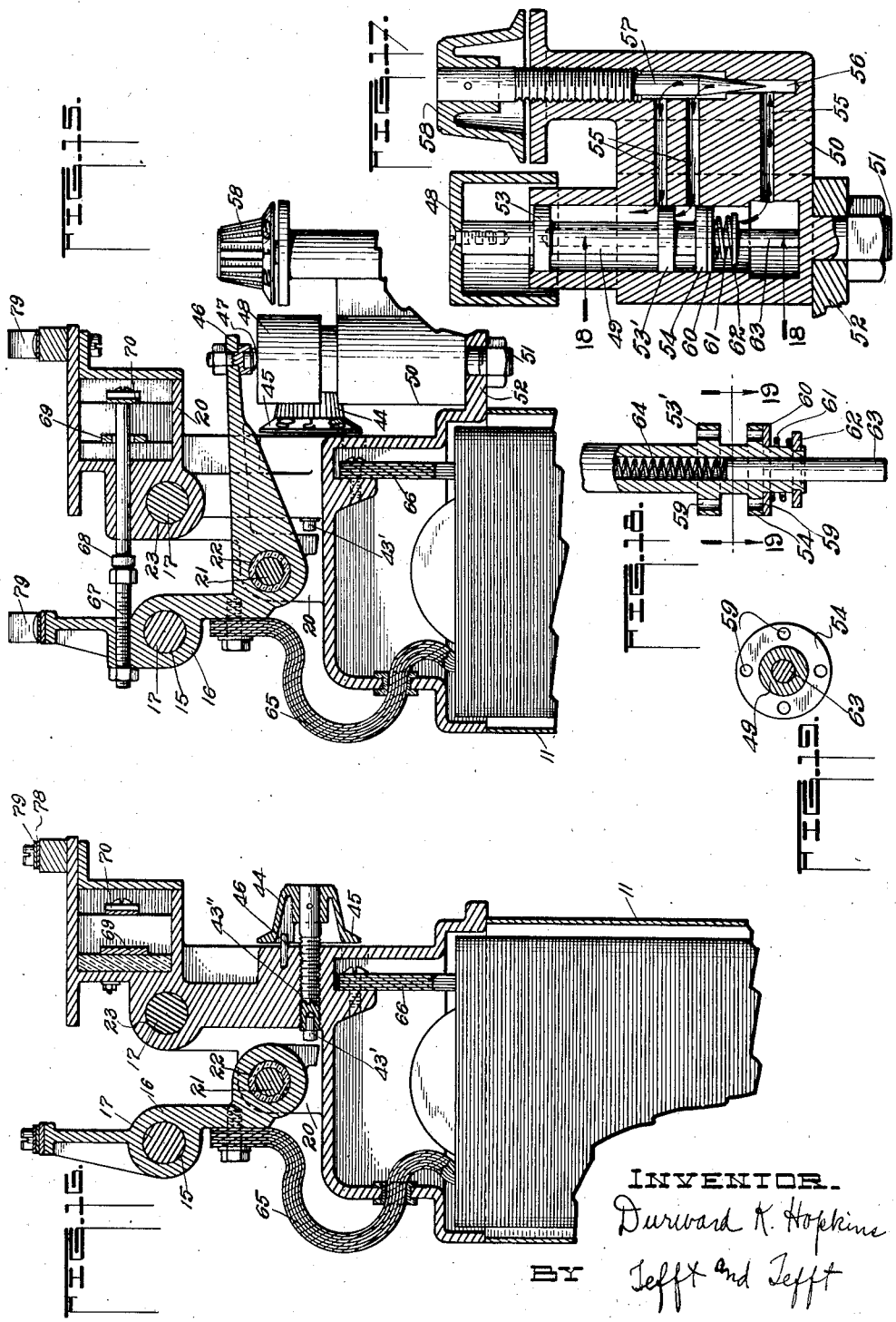

Patented Sept. 24, 1935

2,015,184

UNITED STATES PATENT OFFICE 2,015,184

WELDING MACHINE

Durward K. Hopkins, Peoria, Ill., assignor to Micro Products Company, Peoria, Ill.

Application December 6, 1933, Serial No. 701,134

6 Claims. (Cl. 219—4)

This invention relates to welding machines, more particularly to a machine for automatically butt-welding wire, rods and the like.

One object of the invention is to provide a welding machine adapted to grip and feed automatically the ends of rods to be welded in such a manner as to form a satisfactory butt-welded joint therebetween.

Another object is to provide means associated with the gripping and feeding mechanism for timing the movements of the rods as the weld is being formed in such a manner that either a flash or pressure weld is effected.

A further object is to provide means whereby rods or wires of different sizes and sectional proportions or the same made from different metals may be welded on one machine with uniformly satisfactory results.

An additional object is to provide means whereby, when necessary, the metal adjacent the weld may be annealed or normalized subsequent to the welding operation.

Other objects will appear in the accompanying description and drawings, in which—

Fig. 1 is a broken front elevational view of the device;

Fig. 2 is a broken side elevational view of the same;

Fig. 3 is a fragmented side elevational view of operating mechanism to be described, taken from line 3—3 in Fig. 1;

Fig. 4 is a fragmented sectional elevational view of operating and control mechanism to be described, taken from line 4—4 in Fig. 3;

Fig. 5 is an enlarged front elevational view of the operating head portion of my machine similar to that disclosed in Fig. 1, showing parts in operated position, as will be described;

Fig. 6 is a view similar to that shown in Fig. 5, with parts in another operated position to be described;

Fig. 7 is a perspective view of a gripping shoe used in connection with the apparatus, as will be described;

Figs. 8 and 9 are perspective views of anvil portions cooperative with the shoe shown in Fig. 7;

Fig. 10 is an enlarged side elevational view of the operating head portion of the device showing details of mechanism to be described;

Fig. 11 is a view similar to Fig. 10, taken from the opposite side and having certain portions broken away to permit clearer view of underlying parts;

Fig. 12 is an enlarged sectional detail view of a control means to be described, taken from line 12—12 in Fig. 6;

Fig. 13 is an enlarged detail sectional view of insulated bearing construction to be described, taken from line 13—13 in Fig. 6;

Fig. 14 is a fragmented detail sectional view of parts to be described, taken from line 14—14 in Fig. 10;

Fig. 15 is a fragmented sectional detail view of mechanism to be described, taken from line 15—15 in Fig. 11;

Fig. 16 is a fragmented sectional detail view of mechanism to be described, taken from line 16—16 in Fig. 10;

Fig. 17 is a fragmented sectional detail view of control mechanism to be described;

Fig. 18 is a fragmented detail sectional view of a portion of the control mechanism, taken from line 18—18 in Fig. 17; and Fig. 19 is a detail sectional view taken from line 19—19 in Fig. 18.

Fig. 1 of the drawings discloses my welding machine as generally comprising an operating mechanism supported by a base member 10 upon which is supported a column member 11. Castors such as 12 may be attached, if desired, to enhance portability.

Figs. 5, 6 and 11 best indicate that the head mechanism includes dual levers 13 and 14, lever 13 being pivoted at 15 upon a lever 16, Fig. 11, by means of an integrally formed trunnion 17 rotatably mounted in lever 16 and retained in longitudinal position therein by means of a screw 18.

Lever 16 is pivotally supported, as best shown in Fig. 11, by means of centering studs 18' and 19. Stud 18' is fixedly secured in the frame structure 20, while stud 19 is adjustably mounted therein as shown. Complemental recesses in a shaft 21 co-operate with the studs to provide an accurately centered bearing for the lever. The lever is insulated from the frame and bearing structure by means of a bushing 22.

Lever 14 is pivoted at 23 in the stationary frame structure, by means of a trunnion portion similar to trunnion 17.

Secured to the inner side of the upper ends of levers 13 and 14 are bearing blocks 24. In the lower faces of the blocks arcuate recesses are formed, adapted to movably receive beaded portions 25 of upwardly extending rib portions of shoe members 26. The shoes are shown in perspective in Fig. 7.

Disposed below shoes 25 are anvil blocks 27 and 28. Block 28 is fixedly supported by a bracket portion 29 integral with the frame structure 20, while anvil 27 is supported by a similar bracket integral with lever 16.

To the lower ends of levers 13 and 14 are connected arcuate spring members 29', the outer ends of which are pivotally connected to the levers by means of screws 30. The springs are insulated from the screws and levers by means of washers 31 and bushings 32 as shown in detail in Fig. 13.

Outward flexing movement of the springs is limited by retaining bolts 29''.

The inner ends of the springs are pivotally secured to a head member 33 by means of screws 34. Head 33 is secured to a depending rod 35 by means of a screw 36. Rod 35 is pivotally connected at its lower end to a foot lever 37 by means of a removable pin 38, as shown in Figs. 1 and 2. A series of holes in the lower end of the rod provides adjustment of the foot lever in relation to the rod.

Reference to Figs. 2 and 3 will indicate that foot lever 37 is pivoted at 39 upon a bracket portion 40 secured to the column 11, also that a spring 41 is adapted to urge the foot lever toward an elevated position.

Reference to Figs. 1 and 5 will indicate that upward movement of the lever will operate through springs 29' to move the lower lever ends toward each other to rotate the levers upon the trunnion centers 15 and 23 to move shoes 25 away from anvils 27 and 28.

Fig. 6 indicates that downward movement of the foot lever will bring about spreading movement of the levers which results in placing shoe 25 of lever 14 in contact with anvil 28 and the shoe of lever 13 in contact with anvil 27.

It will be noted that levers 13 and 14 carry small abutment portions 13' and 14' which, when the levers are in position shown in Fig. 5, abut the anvil supporting brackets and that with lever 13 in the Fig. 5 position, any further inward movement of the lever will result in unitary movement of lever 16 upon its centers 18 and 19, this movement obviously bringing about movement of anvil 27 away from anvil 28 to place the anvils in the relative position of Fig. 5.

Downward movement of the foot lever will result in spreading movement of levers 13 and 14 to bring about abutment between the shoes and anvils so noted, by means of which further movement of lever 14 will be prevented, whereas in the case of lever 13, abutment of shoe 25 against anvil 27 will bring about a locked condition between levers 13 and 16, whereby further movement of lever 13 will result in unitary movement of lever 16 to move the anvils toward each other into position indicated in Fig. 6.

Springs 29' obviously form differential resilient connection between the levers and are therefore adapted to provide equalized pressure of shoes 25 against associated anvils or upon articles placed between them, regardless of non-uniform size of such articles.

Lever 16 is normally urged to open position by a spring 42, Fig. 14, operating an abutment pin 43 slidably mounted in a recess formed in frame 20, and inward movement of lever 16 is limited by the inner end of a shank portion of pin 43 abutting the bottom of the recess.

Outward movement of lever 16 is limited by an adjustment screw 43'', Figs. 15 and 16, mounted in the frame structure 20 and carrying an insulating button 43' and a knob 44 having an indexed flange 45. A stop pin 46 limits rotating movement of the knob and screw the described assembly providing means for adjustably limiting operating stroke of lever 16 in a predetermined manner.

Figs. 5 and 15 indicate that lever 16 carries an extending arm 46 to the outer end of which is secured an insulating button 47, the latter adapted to rest upon a cap member 48 which is, in turn, supported upon the upper end of a plunger member 49 of a dash pot mechanism shown in detail in Fig. 17.

The dash pot mechanism comprises a body member 50 provided with a downwardly extending stud portion 51 by means of which the body is secured to a bracket portion 52 of the frame 20.

Plunger 49 is provided with a plurality of ring portions 53, 53' and 54, whereby the plunger is slidably supported within a cylinder formed in the body, rings 53 and 53' acting as guides while ring 54 is adapted to act as piston head to control movement of the plunger. The cylinder and associated ducts are normally filled with liquid.

Leading from the cylinder is a plurality of horizontal ducts 55, the lower of which communicates between the lower portion of the cylinder and a vertical duct 56 having a needle valve member 57 disposed therein adapted to control the flow of liquid therethrough.

The needle valve is made adjustable by means of its screwed mounting in body 50 and is provided at its outer end with an indexed knob 58, whereby it may be adjusted in a predetermined manner.

The upper ducts 55 communicate between the cylinder and an enlarged upper portion of the vertical duct 56.

Reference to Figs. 18 and 19 will disclose that ring 54 is provided with apertures 59 and that a check valve disk 60 is retained against the under side of the lower ring by a spring 61 supported by a fixed washer 62.

Fig. 18 also illustrates a pin 63 slidably mounted within plunger 49 and abutted by a spring 64. By means of pin 63 abutting the bottom of the cylinder, the plunger 49 is constantly urged upwardly to follow any upward movement of lever extension 46. Relatively quick upward movement of plunger 49 is permitted by reason of the liquid flowing through apertures 59 past check valve disk 60 to the lower portion of the cylinder, whereas downward movement is retarded, in an adjustable manner, by reason of the checking action of disk 60 whereby any liquid flowing past ring 54 must do so through the ducts 55 and 56 with needle valve 57 restricting the flow.

It will be noted that the lower portion of the cylinder is enlarged to such an extent that when piston ring 54 reaches a certain point, in its downward travel, the ring enters the enlarged portion of the cylinder whereby the liquid may pass freely around the ring. This action will render the needle valve no longer effective to retard downward movement of the plunger and the plunger will be free to respond, in a relatively quick manner, to the pressure of arm 46 as brought about by the described forced movement of lever 16.

The foregoing will make clear that clockwise movement of lever 16 may be adjustably regulated by means of the dashpot. With this in mind, it will be clear that, with parts in the position shown in Fig. 5, the foot lever 37 may be pushed down, whereupon springs 29' will exert pressure upon levers 13 and 14 to bring about first, gripping contact between shoes 25 and anvils 27 and 28, and second, an automatically timed movement of anvil 27 toward anvil 28, progressing for a certain distance at relatively slow speed followed by a quick finishing movement to complete the stroke, this movement being adjustable as to extent and speed by the means described.

It will be noted that levers 13 and 16 are insulated from the remaining mechanism and that lever 16 is connected with a source of current by means of a flexible coupling 65. The opposite side of the circuit is connected with the frame structure 20, through a connector 66, as best shown in Fig. 16.

The transformer devices from which current is supplied are preferably disposed within the column 11. Since they may be of any form or manufacture, they will not be here described further than to say that they are suitably connected with levers 13 and 14 by which means the shoes and associated anvils become in fact electrodes and that the current supply thereto is controlled by means of switch mechanisms associated with my welder, as follows:

Fig. 15 will indicate that a screw 67 is carried in the upper part of lever 16, the head of which abuts an opposing head of a pin 68. Pin 68 is made from insulating material and is slidably mounted in structure 20. Fig. 12 illustrates that the pin extends into a chamber formed in the frame structure in which is disposed a switch mechanism comprising contact members 69 and 70. Pin 68 passes through contact 69 and abuts contact 70 in such a manner that when lever 16 progresses toward center a predetermined distance, contact 70 is removed from contact 69 to break the electrical circuit, whereas when the foot lever 37 is pressed down to move lever 16 backwardly, as described, the circuit is automatically reestablished.

A further circuit control means is provided in a switch mechanism disposed adjacent foot lever 37.

Figs. 2, 3 and 4 illustrate that this latter mechanism comprises a lever member 71 pivoted upon column 11 at 72 and urged upwardly at its outer end by a spring 73 supported by the base 10.

Disposed below lever 71, enclosed in a suitable cover, is a switch mechanism comprising a contact 74, a co-operative contact spring 75 and an actuating pin 76 composed of insulating material. It will be apparent that lever 71, upon downward movement, is adapted to engage pin 76 to establish contact between members 74 and 75 and upon upward movement to break the contact, which position is indicated in Fig. 4.

Fig. 1 indicates that lever 71 is disposed at right angles with foot lever 37, which latter carries a screw 77 adapted to engage lever 71 when the foot lever is moved downwardly, which movement of the foot lever results in corresponding movement of lever 71 to close the circuit between contacts 74 and 75, while upward movement thereof results in opening of the circuit.

It is to be noted, Fig. 3, that lever 71 is so disposed as to be available for operation to close the switch independently of lever 37. The utility of this will be explained shortly.

Figs. 5, 6, 10 and 11 illustrate that lever 16 and frame 20 have upwardly extending portions which carry electrode clips comprising clip springs 78 and reinforcing springs 79. The utility of these will be explained.

Secured to column 11 is an upwardly extending bracket member 80 which carries a lamp and guard member 81, whereby the operating points of the mechanism may be properly illuminated without danger to the lamp, and a vise mechanism comprising a stationary lower jaw 82 and a movable upper jaw 83.

Jaw 83 is movably mounted upon jaw 82 by means of a screw 84 and is operated by means of a hand lever 85, the same being rotatably mounted in upwardly extending portions 86 integral with jaw 82 and passing through openings in jaw 83.

An eccentric member secured to the shank of the hand lever between extensions 86 co-operates with an extending portion 87 of jaw 83 in such a manner that manipulation of the handle results in opening and closing movement of the jaws.

Practical operation of the device is as follows:

For flash welding purposes, the limit of travel controls for lever 16 are first adjusted to give the desired extent of movement and the dash pot mechanism is adjusted to provide suitable speed of operation.

The adjustments having been suitably arranged, the rods to be welded are placed upon the anvils 27 and 28 respectively with their ends spaced in a predetermined relation, whereupon the foot lever 37 is fully depressed, thus instantly clamping or gripping the rods upon the anvils, closing switch 74—75 to supply current to the transformer, and beginning a substantially slow progressive movement of anvil 27 toward anvil 28, as controlled by the dashpot. Upon contact of the rod ends, the welding process will begin and continued movement of the rod in anvil 27 toward that in anvil 28 will result in continued burning away of the rod ends until lever 16 progresses sufficiently to bring the screw 67 into contact with pin 68 to break the circuit of switch 69—70. At substantially this point piston ring 54 enters the enlarged portion of the cylinder to relieve the back pressure provided by the dashpot and thus allow lever 16 to quickly move a short distance to force the rod ends together to effect a weld, the extent of the final movement being limited by means of lever 16 engaging pin 48.

It is apparent that by means of the several control elements described, the mechanism may be adjusted to perform automatically a cycle of operation which will produce a welded joint between rods placed therein substantially as follows:

The spaced rod ends are first moved toward each other to a point where electrical contact takes place, whereupon that portion of the metal in contact is quickly burned away and an arc is established whereby the metals are burned away as movement of the rod ends progresses at a relatively slow rate, which rate would ordinarily be such that removal of metal by burning progresses slightly faster than the rate at which the rod ends move toward each other. By this action, the original arc is maintained during progress of the movement to a point where the current is shut off, at which point the highly heated rod ends are suddenly forced together under suitable pressure to weld and upset the metal, whereupon at a suitable point, further movement is prevented. The described preliminary burning action is effective to prepare the rod ends, both as to temperature and conformity, for the final welding action.

The circuit of switch 69—70 is re-established immediately upon beginning of return movement of lever 16; however, the circuit as a whole remains broken by reason of simultaneous opening of switch 74—75 as brought about by release and upward movement of foot lever 37.

With the above cycle of operation completed, release of the foot lever will result in release of the welded rods and replacement of parts in original position, see Fig. 5.

For pressure welding operation, the operating cycle is substantially the same, with the several adjustments described suitably arranged.

It might be stated at this time that my device will perform its full operation as a welding machine of the resistance type without the use of the dashpot or other timing means. In other words, resistance welding of a certain class of materials may be readily accomplished by using the present machine in its normal operation with the exception that the dashpot or timing mechanism may either be adjusted for non-use or entirely removed.

For rods of circular or substantially uniform cross-section, anvils having recesses similar to those shown in Fig. 8 are used. For rods of other cross-sections anvils of suitable form may be used, an example being shown in Fig. 9 which shows an anvil adapted for use with rods having flat or oblong cross section. Obviously, anvils of various forms may be made interchangeable and are easily attached and removed by means of screws such as 27' shown in Fig. 11.

As is well known, temperatures set up during a welding operation are likely to bring about, in certain materials, undesired molecular changes such as brittleness. To provide for annealing the area adjacent the welded joint, the electrode clips 78 are available.

As has already been noted, lever 16 and frame structure 20 form opposite poles of the secondary transformer circuit. It will be apparent therefore that after the welding operation is completed, the rod may be removed from the gripping devices and placed under the clips to form a circuit therebetween. With the rod in this position, the lever 71 may be depressed by the operator's foot to operate switch 74—75 to supply current to the clips, whereby the rod may be heated to any desired annealing temperature, this being accomplished without operation of the mechanism.

The vise 82—83 may be used for temporarily holding the rods while cooling or while burr is being removed from the welded portions.

What I claim is:

1. A welding machine having in combination dual gripping mechanisms electrically insulated from each other and movable relative to each other, means for supplying electric current thereto, the gripping mechanisms adapted to grip materials in spaced relation and to be moved to bring said materials into physical contact, manually operable differential means for gripping the materials in an equalized manner, means abutted by one of said gripping mechanisms for moving the same relative to the other and adjustable automatic means for controlling the extent and speed of said movement.

2. A welding machine having in combination dual levers disposed in a parallel manner, one being pivotally mounted upon a stationary support and having a movably mounted shoe member attached at its upper end, an anvil-electrode member supported upon said stationary support so disposed relative to said lever and shoe as to be abutted by the latter when the lever is rotated upon its pivot in such a manner that materials to be welded may be gripped therebetween, the other lever being pivotally mounted upon a third lever and having a movably mounted shoe member attached to its upper end, an anvil-electrode member supported upon the third lever so disposed relative to the second lever and shoe as to be abutted by the latter at the beginning of rotation of the second lever upon its pivot in such a manner that materials to be welded may be gripped therebetween, and upon continuation of said rotation to impart unitary rotation of the third lever upon its pivot, the latter being so disposed relative to the first and second named levers that the aforesaid rotation of the third lever brings about movement of the anvil and shoe associated therewith toward the anvil and shoe associated with the first named lever, automatic means co-operative with the third lever for controlling the speed of movement thereof, manually operable differential mechanism for moving the first and second levers in such a manner that the gripping pressure of said shoes and anvils is equal and for imparting the described movement to the third lever the same comprising a foot lever, and a supporting stand for the described mechanism.

3. A device of the class described having in combination a mechanism for gripping the ends of materials to be welded in adjacent spaced position said mechanism comprising dual anvils movable with respect to each other, dual levers pivotally mounted adjacent thereto the same having portions adapted to bear upon said anvils when said levers are rotated upon their pivots whereby said ends of materials are gripped between said anvils and lever portions, means for rotating said levers to effect gripping as aforesaid comprising a resilient toggle mechanism connecting portions of the levers and manual means for operating the toggle mechanism.

4. A device of the class described having in combination a mechanism for gripping the ends of materials to be welded in adjacent spaced position said mechanism comprising dual anvils at least one of which is movable with respect to the other, dual levers pivotally mounted adjacent thereto, each having portions adapted to bear upon one of said anvils when the levers are rotated upon their pivots whereby said ends of materials are gripped between said anvils and lever portions, means for moving said movable anvil and its associated lever toward or away from the opposite anvil and lever comprising a support for the former movable by means of movement of the associated lever, and means for moving the levers to effect gripping of the materials and movement of said movable anvil comprising resilient toggle mechanism connecting portions of the levers and manual means for operating the toggle mechanism.

5. A welding machine having in combination dual gripping mechanisms movable relative to each other whereby materials to be welded may be gripped in spaced relation and subsequently moved toward each other, manually operable mechanism differentially connected with said gripping mechanisms whereby a single movement of said manually operable mechanism first causes actuation of the gripping mechanism to grip said materials with equal pressure and finally movement of at least one of said gripping mechanisms toward the other to bring said materials into abutment for welding.

6. A welding machine having in combination dual gripping mechanisms movable relative to each other whereby materials to be welded may be gripped in spaced apart position and subsequently moved toward each other, manually operable mechanism differentially connected with said gripping mechanisms whereby a single movement of said manually operable mechanism first causes actuation of the gripping mechanism to grip said materials with equal pressure and finally movement of at least one of said gripping mechanisms toward the other to place said materials in abutment for welding the assembly adapted to operate in such a manner that said grip pressure is automatically increased in accordance with the pressure of abutment between the surfaces of the materials.

DURWARD K. HOPKINS.